United States Patent
Upadhyay et al.

(10) Patent No.: US 12,373,836 B2
(45) Date of Patent: Jul. 29, 2025

(54) VOICE-BASED APPARATUS FOR A DISTRIBUTED TRANSACTION COMPUTING SYSTEM

(71) Applicant: Bank of America Corporation, Charlotte, NC (US)

(72) Inventors: Vineet Kumar Upadhyay, Hyderabad (IN); Ramakrishnan Swaminathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 641 days.

(21) Appl. No.: 17/724,836

(22) Filed: Apr. 20, 2022

(65) Prior Publication Data

US 2023/0342779 A1 Oct. 26, 2023

(51) Int. Cl.
*G06Q 20/40* (2012.01)
*G10L 17/06* (2013.01)

(52) U.S. Cl.
CPC ........ *G06Q 20/40145* (2013.01); *G10L 17/06* (2013.01)

(58) Field of Classification Search
CPC .................. G06Q 20/00–425; G10L 17/00–26
See application file for complete search history.

(56) References Cited

U.S. PATENT DOCUMENTS

| | | |
|---|---|---|
| 10,657,953 B2 | 5/2020 | Park et al. |
| 11,348,591 B1 * | 5/2022 | Moinuddin ............. G10L 25/24 |
| 2011/0286584 A1 * | 11/2011 | Angel ............... H04M 3/42221 |
| | | 379/88.02 |
| 2019/0087446 A1 * | 3/2019 | Sharma ................. H04L 9/3239 |
| 2020/0001110 A1 | 4/2020 | Wood et al. |
| 2022/0292268 A1 * | 9/2022 | Shillingford .......... G06F 16/313 |

FOREIGN PATENT DOCUMENTS

KR 102216048 B1 2/2021

* cited by examiner

*Primary Examiner* — Mohammad A. Nilforoush
(74) *Attorney, Agent, or Firm* — Banner & Witcoff, Ltd.

(57) ABSTRACT

A voice and dialect matching computing device processes audio signals received from two sources to authenticate and secure information associated with creation of an electronic transaction. This voice based computing device automatically processes audio signals to identify participants based on voice information and/or dialect information. The voice based computing device compares a vocal signal and/or dialect information using an intelligent processing unit (e.g., an artificial intelligence/machine learning based model) and/ or using historical information stored in a central dynamic data store. The processed audio signals are decomposed into at least two signals, where a first signal may be used as a trigger to activate processing of an electronic transaction by a smart contract hub computing device. The second signal includes attributes of the electronic transaction which may then be encrypted. These trigger signal initiates selection of a smart contract to process the electronic transaction and the second signal facilitates automatic execution of the transaction using the smart contract and via a distributed ledger computing system.

20 Claims, 5 Drawing Sheets

VOICE-BASED APPARATUS FOR A DISTRIBUTED TRANSACTION COMPUTING SYSTEM

BACKGROUND

Aspects of the disclosure relate to computer hardware and software. In particular, one or more aspects of the disclosure generally relate to computer hardware and software for deploying and implementing voice-based trading and tracking computing platforms to support distributed derivative trading.

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification and triggering of electronic transactions via a distributed ledger computing system based on captured audio signals.

The voice based computing device may be configured to communicate with a distributed electronic transaction computing system may use an audio recording of trade counter party participants (e.g., an audio recording of a telephone call, an audio/video recording of an electronic meeting, and the like) to authenticate and/or secure a proposed electronic transaction (e.g., a trade), and automatically coordinate affirmation messages it with a participating trade partner computing system. The voice based computing device may automatically process audio signals to identify participants of the meeting based on voice information and/or dialect information. The voice based computing device may compare a vocal signal and/or dialect information using an intelligent processing unit (e.g., an artificial intelligence/machine learning based model) and/or using historical information stored in a central dynamic data store. For example, the historical information may include processed and/or unprocessed audio signals associated with particular individuals associated with enterprise organizations (e.g., a first individual associated with a first enterprise organization, a second individual associated with a second enterprise organization, and the like). Additionally, the central dynamic data store may further store information associated with dialects spoken by one or more individuals associated with each of a plurality of enterprise organizations.

The voice based computing device, or other computing device, may decompose the processed audio signal into at least two signals, where a first signal may be used as a trigger to activate processing of an electronic transaction by a smart contract hub computing device. A second signal may include at least a portion of a processed audio signal that may be converted using a natural language processing (NLP) algorithm to extract all key attributes of the electronic transaction which may then be encrypted. Both signals may be further encoded with a unique identifier (e.g., a digital watermark) to maintain data security. In some cases, a portion of the processed audio signal (e.g., a first signal portion) may be processed by an intelligent computation unit that decodes and compares the signal using a dynamic database of Smart Contract agreements and generates a trigger signal for activating an appropriate smart contract that facilitates a desired electronic transaction between two separate enterprise computing systems (e.g., the trade party and the trade counter party). The smart contract may be stored within a block of a distributed ledger computing system (e.g., a blockchain computing system, a holochain computing system, and the like). The smart contract may activate computing nodes of the parties involved in the electronic transactions and the enterprise computing systems of each of the trade parties receive the uniquely encrypted core message, as a part of a second portion of the signal, that includes complete trade details. After the second portion of the signal is received at the node (e.g., a distributed ledger computing node), the embedded unique code may be verified and the core message may be decoded by a computing device on each enterprise network (e.g., a distributed ledger computing node). After verification, a block may be generated within the distributed ledger (e.g., blockchain) to initiate the electronic transaction and/or confirming the trade.

Aspects of a computing system performing voice-based identification and execution of electronic transactions may be configured to perform voice and dialect matching of portions of audio signals, audio signal processing, and signal generation and/or decomposition to identify and facilitate electronic trade generation over a distributed computing network. Aspects of the computing system may be configured to perform voice-based signal activation of a contract hub and/or triggering use of smart contracts via dual signal match technology between the smart contract and a distributed ledger computing system (e.g., a blockchain system, a holochain system, and the like) to secure electronic transactions between different computing networks. Aspects of the computing system may facilitate automatic affirmation of electronic transactions using distributed computing systems and smart contracts.

Aspects of a voice based apparatus and computing system may perform voice based authentication of derivative trades via audio signal processing and analysis using intelligent learning models, voice-based signal activation and triggering of smart contracts, automatic electronic transaction affirmation using distributed ledger technology and smart contracts.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
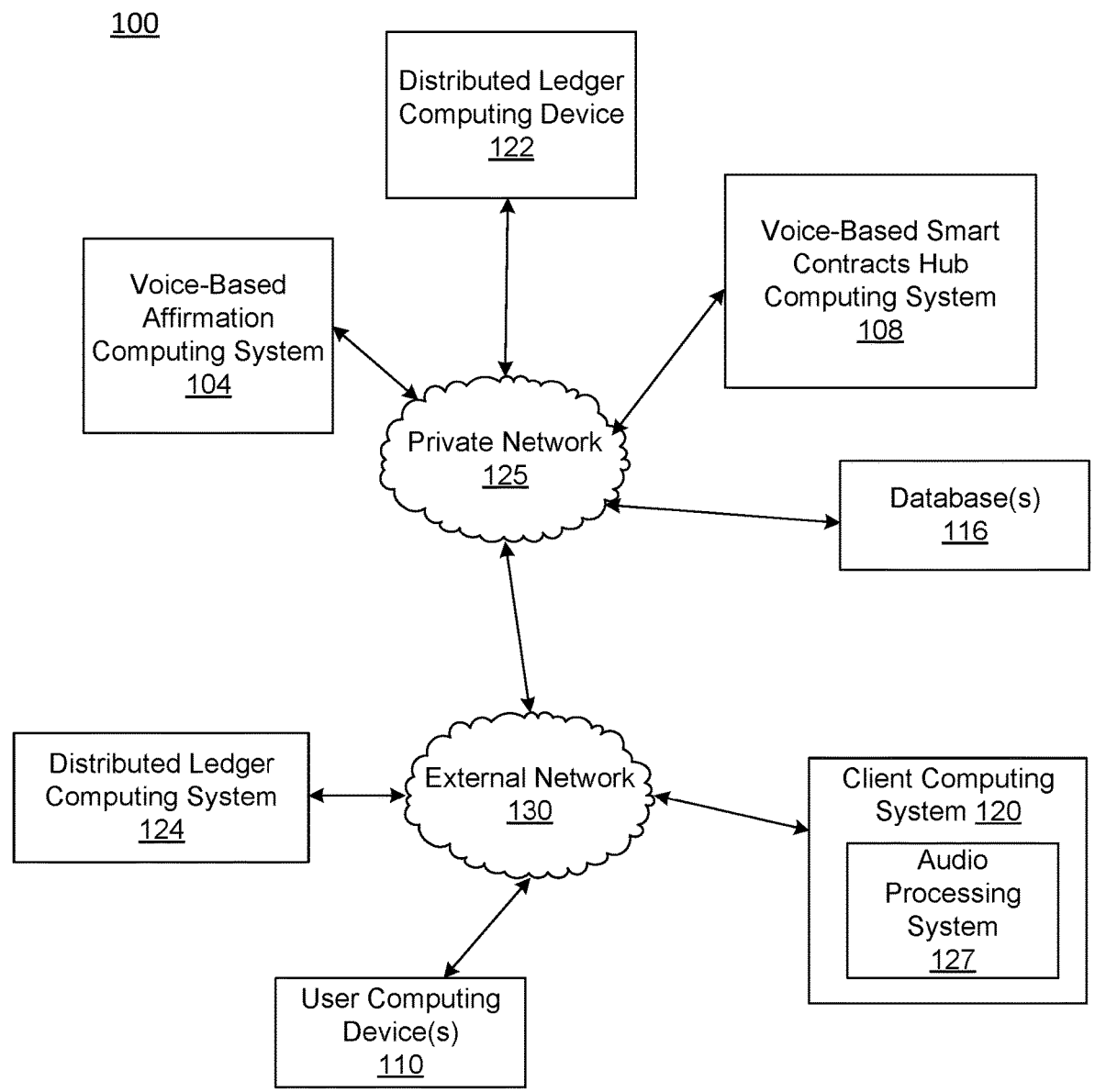
FIG. 1A shows an illustrative computing environment for information extraction from audio signals and audio signal based triggering of electronic transactions, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Electronic transactions between parties may be initiated via multiple channels, such as an electronic chat or via other electronic messaging platform and/or an audio communication (e.g., a telephone call) between two or more parties to the electronic transaction (e.g., a trader, a counter-party, and the like). For electronic transactions (e.g., trades) booked via a telephone, a person may listen to a recording of the call in an attempt to extract details of the transaction, which may then be entered into a booking computing system. Once entered, the trade details require additional confirmation and affirmation before the electronic transaction may be initiated. Because trade information is not captured directly, errors may be introduced that may render the electronic transaction incapable of being processed and/or introduce processing delays, and an increase in messages communicated via the organizations' computing systems.

FIG. 1A shows an illustrative computing environment 100 for information extraction from audio signals and automatic audio signal based triggering of electronic transactions, in accordance with one or more arrangements. The computing environment 100 may comprise one or more devices (e.g., computer systems, communication devices, and the like). The computing environment 100 may comprise, for example, a voice-based affirmation computing system 104, a voice-based smart contracts hub computing system 108, a distributed ledger computing device 122, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the voice-based smart contracts hub computing system 108 as being separate from the voice-based affirmation computing system 104, the voice-based smart contracts hub computing system 108 may be incorporated within the voice-based affirmation computing system 104.

The voice-based affirmation computing system 104 may comprise one or more computing devices and/or other computer components (e.g., processors, memories, communication interfaces) configured to perform one or more functions as described herein, such as and including the voice-based smart contracts hub computing system 108. Further details associated with the architecture of the voice-based affirmation computing system 104 and/or the voice-based smart contracts hub computing system 108 are described with reference to FIG. 1B.

The computing system may include one or more application systems that may comprise one or more computing devices and/or other computer components (e.g., processors, memories, communication interfaces). In addition, the application system and/or a client system may be configured to host, execute, and/or otherwise provide one or more enterprise applications. In some cases, the application systems may host one or more services configured facilitate operations requested through one or more API calls, such as data retrieval and/or initiating processing of specified functionality. In some cases, the client computing system may be configured to communicate with one or more of the application systems via API function calls and the services. In an arrangement where the private network 125 is associated with a financial institution (e.g., a bank), the application systems may be configured, for example, to host, execute, and/or otherwise provide one or more transaction processing programs, such as an online banking application, fund transfer applications, and/or other programs associated with the financial institution. The client computing system and/or the application systems may comprise various servers and/or databases that store and/or otherwise maintain account information, such as financial account information including account balances, transaction history, account owner information, and/or other information. In addition, the client computing system and/or the application systems may process and/or otherwise execute transactions on specific accounts based on commands and/or other information received from other computer systems comprising the computing environment 100. In some cases, one or more of the client computing system and/or the application systems may be configured, for example, to host, execute, and/or otherwise provide one or more transaction processing programs, such as trading applications, electronic fund transfer applications, online loan processing applications, and/or other programs associated with the financial institution.

The application systems may be one or more host devices (e.g., a workstation, a server, and the like) or mobile computing devices (e.g., smartphone, tablet). In addition, an application systems may be linked to and/or operated by a specific enterprise user (who may, for example, be an employee or other affiliate of the enterprise organization) who may have administrative privileges to perform various operations within the private network 125. In some cases, the application system may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces) and may include one or more components to capture and/or process audio and/or video signals, such as an audio processing system 127. The client computing system 120 may be configured, for example, to host, execute, and/or otherwise provide one or more electronic transaction processing programs, and/or one or more applications to facilitate configuration of an electronic transaction, such as audio/video conferencing applications (e.g., a web-based communication application, a software-based teleconferencing application, an audio/video recording application and the like). In some cases, the client computing system 120 may be used by multiple parties to facilitate creation or inception of an electronic transaction. For example, a first party to the electronic transaction may contact a potential counterparty to initiate a proposed electronic transaction. A recording (e.g., an audio recording, an audio/video recording, and the like) of a conversation may be recorded and processed to provide at least an audio signal including details of the proposed electronic transaction. The audio processing system 127 may be configured to provide at least partial preprocessing of an audio signal of the recording of the proposed electronic transaction. The client computing system 120 may communicate the preprocessed audio recording to the voice-based affirmation computing system 104 for further processing to automatically initiate an electronic transaction, based on the recorded proposed transaction information.

The user device(s) 110 may be computing devices (e.g., desktop computers, laptop computers) or mobile computing device (e.g., smartphones, tablets) connected to the network 130. In some cases, one or more of the user devices 110 may be connected to the network 125. The user device(s) 110 may be configured to enable the user to access the various functionalities provided by the devices, applications, and/or systems in the network 125, such as via the network 130.

The database(s) 116 may comprise one or more computer-readable memories storing information that may be used by the voice-based affirmation computing system 104. For example, the database(s) 116 may store API code of an API to be tested, API test classes, and the like In some cases, the database(s) 116 may store voice information corresponding to users associated with one or more business entities. In some cases, the database(s) 116 may store information corresponding to one or more smart contracts. In an arrangement, the database(s) 116 may be used for other purposes as described herein. In some cases, the client computing system 120 may call one or more API functions to write data or read data to the database(s) 116 via the services.

In one or more arrangements, the voice-based affirmation computing system 104, the voice-based smart contracts hub computing system 108, the distributed ledger computing device 122, the distributed ledger computing system 124, the client computing system 120, the user devices 110, and/or the other devices/systems in the computing environment 100 may be any type of computing device capable of receiving input via a user interface, and communicating the received input to one or more other computing devices in the computing environment 100. For example, the voice-based affirmation computing system 104, the voice-based smart contracts hub computing system 108, the distributed ledger computing device 122, the distributed ledger computing system 124, the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the voice-based affirmation computing system 104, the voice-based smart contracts hub computing system 108, the distributed ledger computing device 122, the distributed ledger computing system 124, the client computing system 120, the user devices 110, and/or the other devices/systems in the computing environment 100 may, in some instances, be and/or comprise special-purpose computing devices configured to perform specific functions.

Figure 1B:
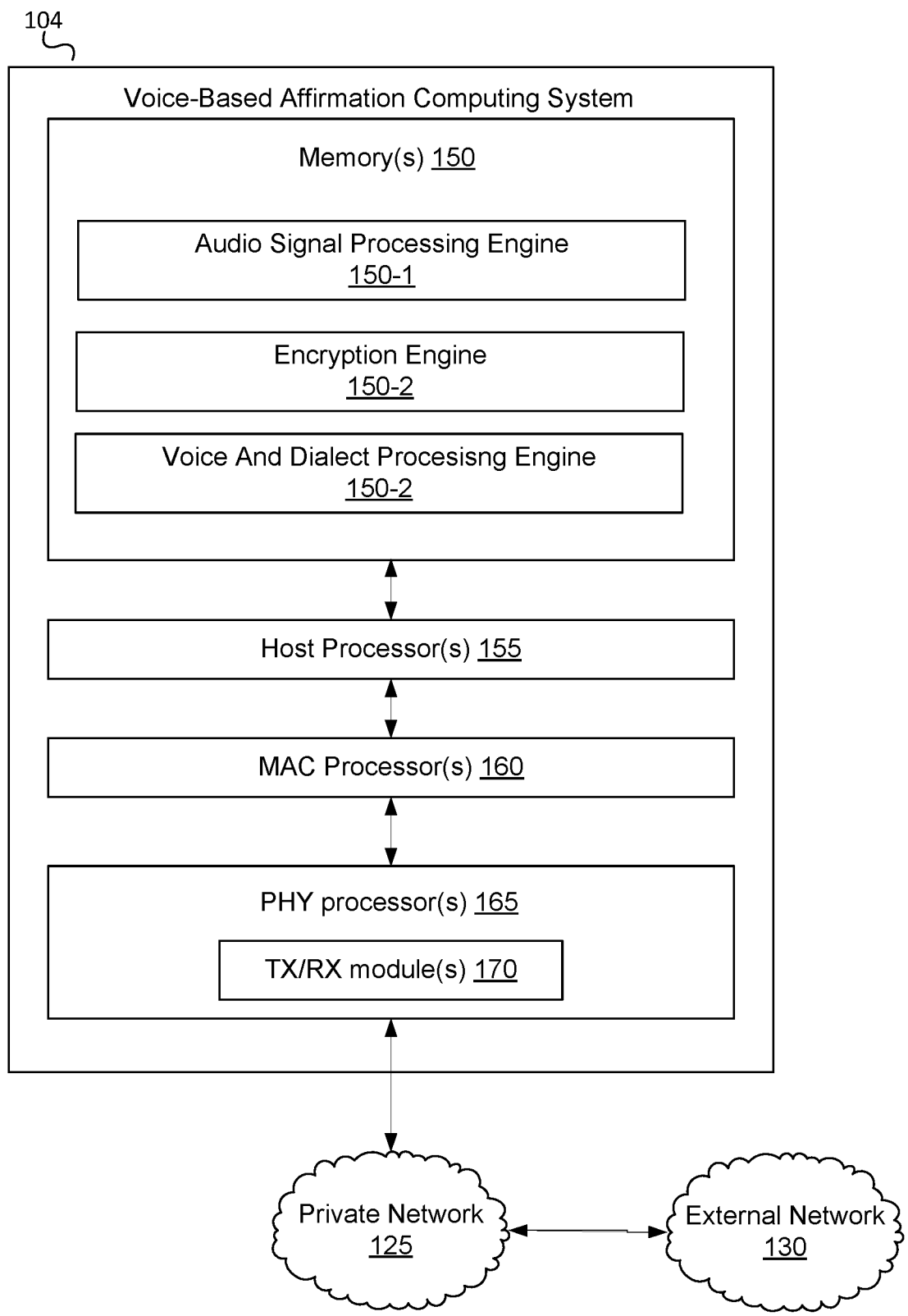
FIG. 1B shows an illustrative computing platform enabled for audio signal analysis and audio signal based triggering of electronic transactions, in accordance with one or more aspects described herein.

FIG. 1B shows an illustrative voice-based affirmation computing system 104 in accordance with one or more examples described herein. The voice-based affirmation computing system 104 may be a stand-alone device and/or may at least be partial integrated with the voice-based smart contracts hub computing system 108 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The voice-based affirmation computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the voice-based affirmation computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the voice-based affirmation computing system 104 may be configured to execute machine readable instructions stored in memory 150. The memory 150 may comprise (i) one or more program modules/engines having instructions that when executed by the one or more processors cause the voice-based affirmation computing system 104 perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the voice-based affirmation computing system 104 and/or by different computing devices that may form and/or otherwise make up the voice-based affirmation computing system 104. For example, the memory 150 may have, store, and/or comprise an audio signal processing engine 150-1, an encryption engine 150-2, a voice and dialect processing engine 150-2, and/or the like. The audio signal processing engine 150-1 may have instructions that direct and/or cause the voice-based affirmation computing system 104 to perform one or more operations associated with preprocessing or processing audio signals, breakdown of audio signals and/or signal reconstruction and the like. The encryption engine 150-2 may have instructions that may cause the voice-based affirmation computing system 104 to encrypt at least a portion of the audio signal, such as user identification information, account information, electronic transaction information and the like. The voice and dialect processing engine 150-2 may have instructions that may cause the voice-based affirmation computing system 104 to perform voice and/or dialect processing functionality, such as determining identifying features of the audio signal associated with a user voice, user pronunciation, and/or other identification functionality.

While FIG. 1A illustrates the voice-based affirmation computing system 104, and/or voice-based smart contracts hub computing system 108, as being separate elements connected in the private network 125, in one or more other arrangements, functions of one or more of the above may be integrated in a single device/network of devices. For example, elements in the voice-based affirmation computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the voice-based smart contracts hub computing system 108.

Figure 2:
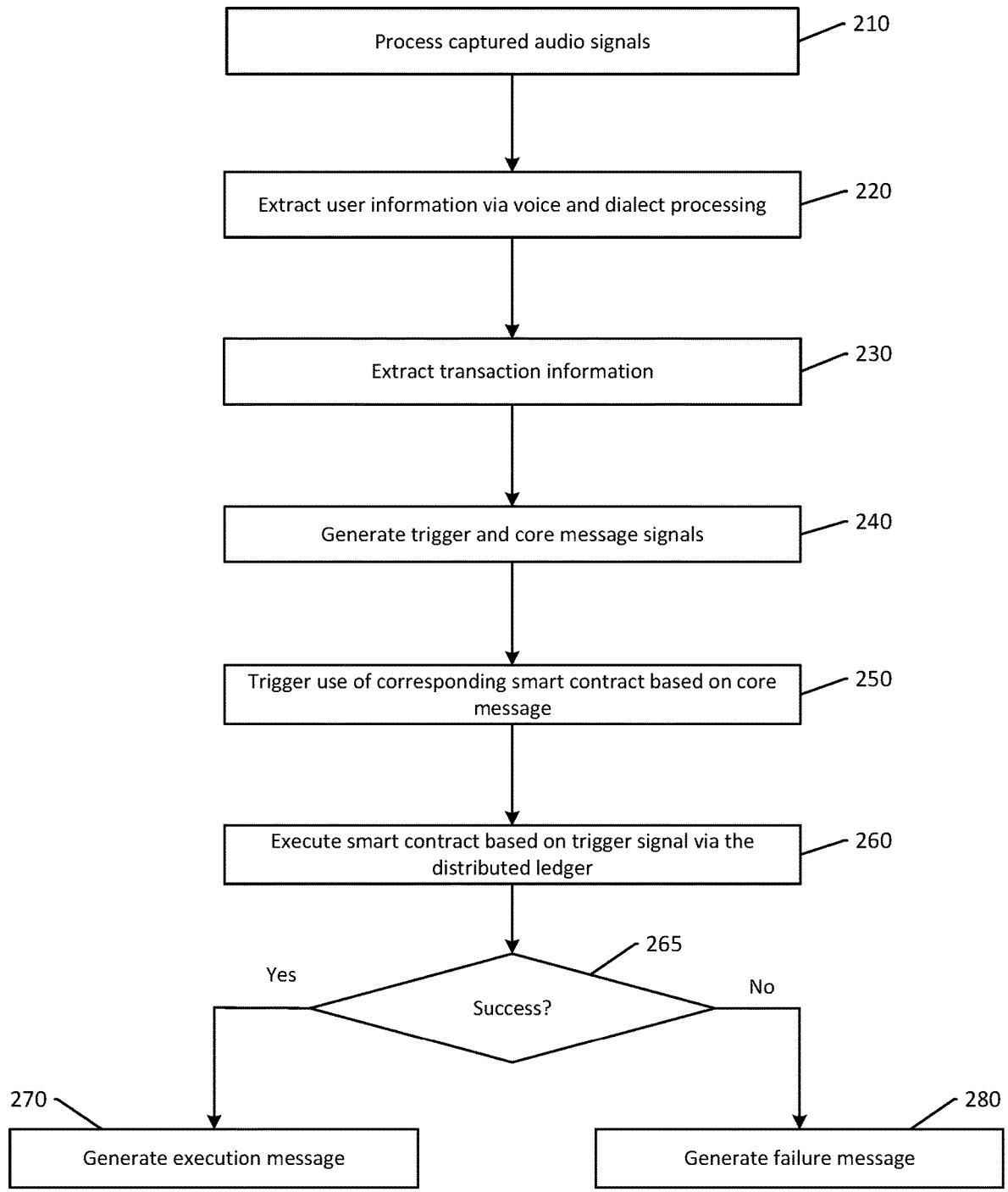
FIG. 2 shows an illustrative process for information extraction from audio signals and audio signal based triggering of electronic transactions, in accordance with one or more aspects described herein.

FIG. 2 shows an illustrative process for information extraction from audio signals and audio signal based triggering of electronic transactions, in accordance with one or more example arrangements. At 210, audio signals may be captured by the client computing system 120, where the captured audio signal may include electronic transaction information corresponding as discussed between enterprise organization representatives. At 220, the audio signals may be processed by the voice-based affirmation computing system 104 to extract user information via voice and/or dialect processing, such as by comparing portions of the captured audio signal to historical audio information stored in the database 116. At 230, the voice-based affirmation computing system 104 may extract information associated with a proposed electronic transaction, such as an amount, an interest rate, a term including a start date, an end date, a duration, and the like. At 240, the voice-based affirmation computing system 104 may generate at least two signals based on the information extracted from the captured audio signal, such as a triggering signal and a core message signal.

The voice-based affirmation computing system 104 may communicate one or more of the at least two signals to the voice-based smart contracts hub computing system 108, where the trigger signal may trigger use of a smart contract corresponding to identified parties and counter parties of the proposed electronic transaction at 250 and the smart contract may be executed, based on the trigger signal, via the distributed leger computing system at 260. At 265, the voice-based smart contracts hub computing system 108 may determine whether the electronic transaction is initiated by the smart contract. If so, an execution message is generated and communicated to the initiating parties at 270. If, at 265 the electronic transaction has not initiated correctly, the voice-based smart contracts hub computing system 108 may be configured to output an error if the electronic transaction fails to be executed.

Figure 3:
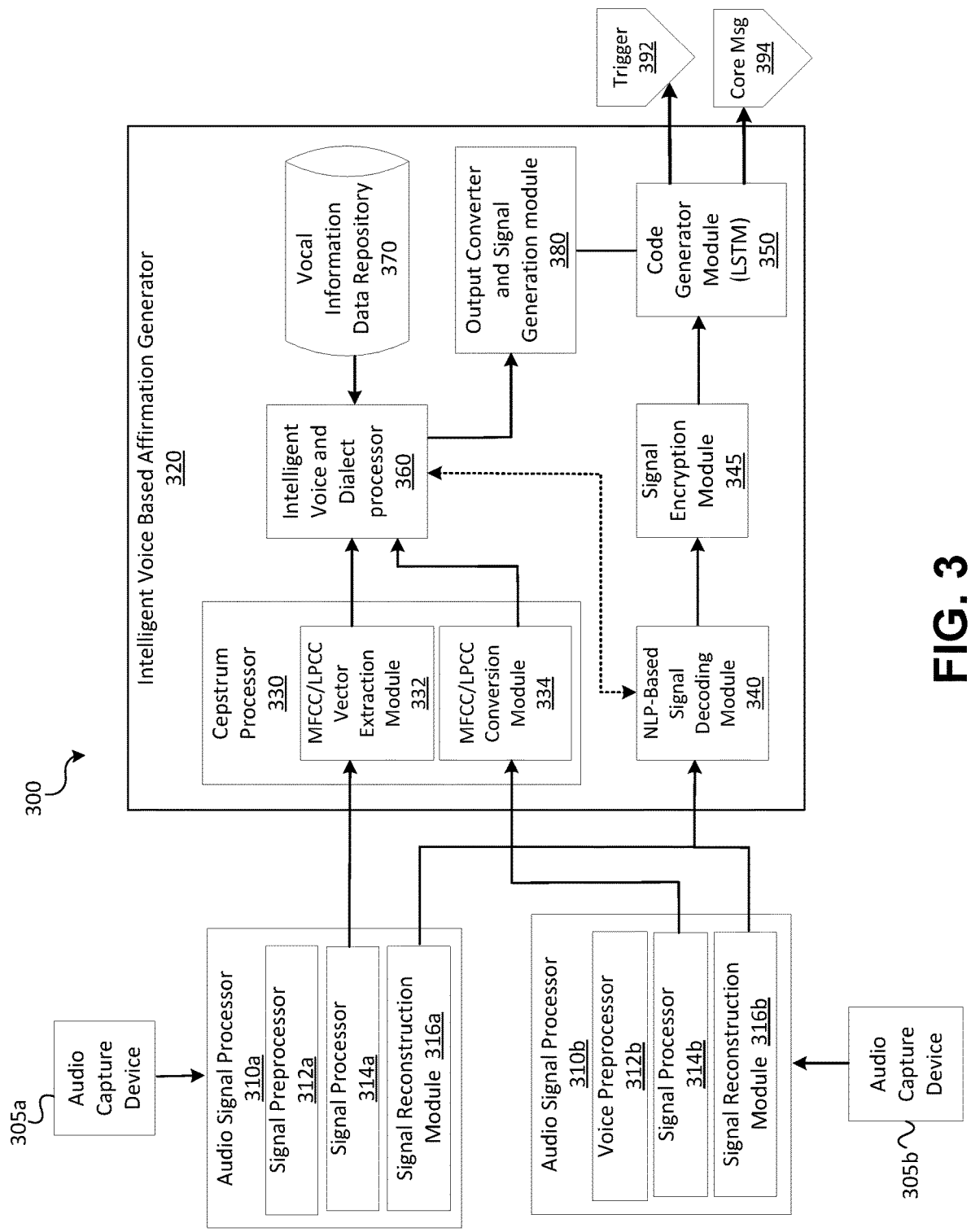
FIGS. 3 and 4 show an illustrative computing system enabled for audio signal analysis and audio signal based triggering of electronic transactions, in accordance with one or more aspects described herein.
Figure 4:
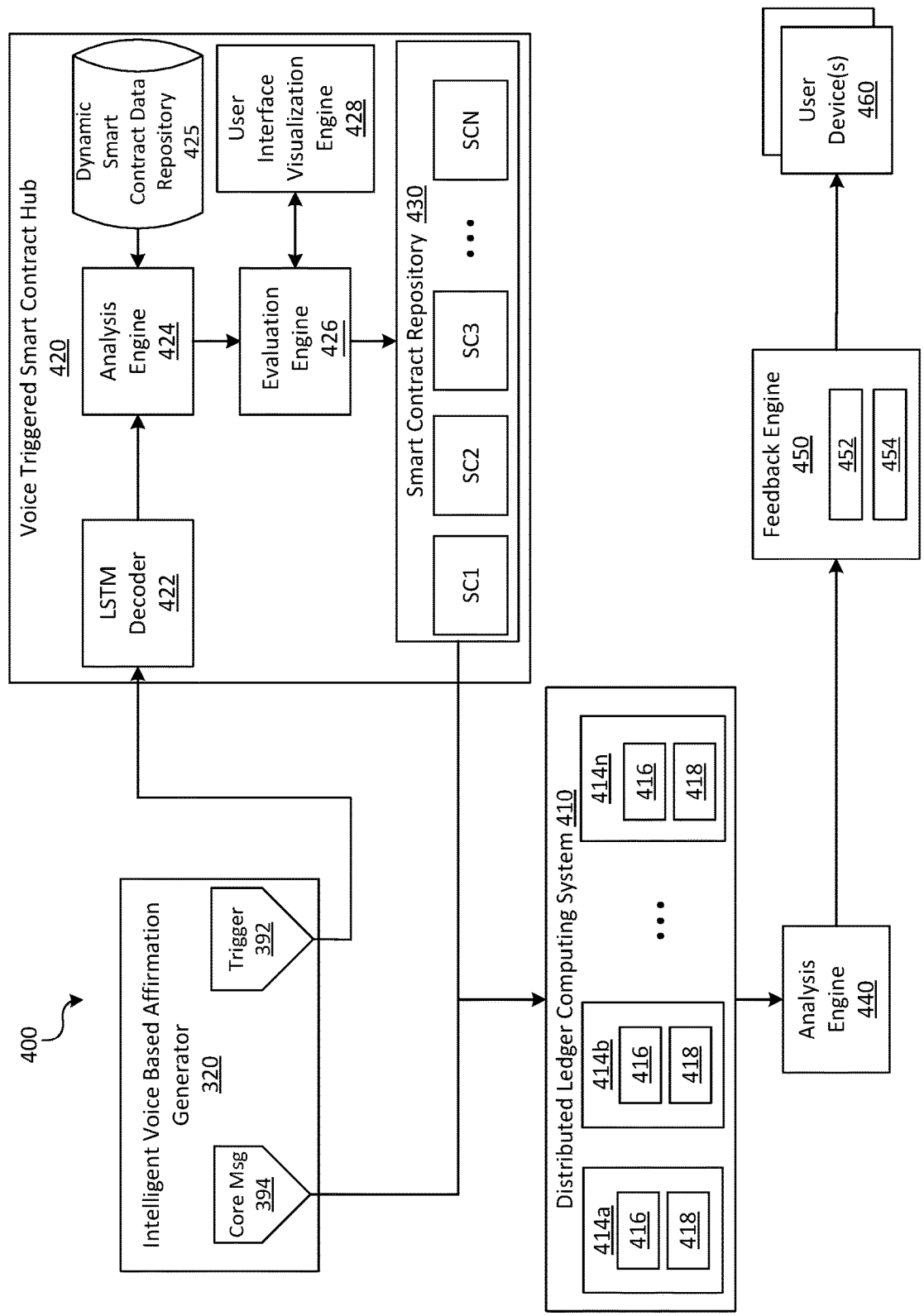

FIGS. 3 and 4 show an illustrative computing system 300 enabled for audio signal analysis and audio signal based triggering of electronic transactions, in accordance with one or more aspects described herein. The computing system 300 may include two or more audio capture devices 305*a*, 305*b*, one or more audio signal processing devices 310*a*, 310*b*, and an intelligent voice based affirmation generator 320. In some cases, all or some components of a computing system 400, as shown in FIG. 4, may be included in and/or communicatively coupled to components of the computing system 300 of FIG. 0.3. The computing system 400 may include the voice based affirmation generator 320, a voice triggered smart contract hub 420, an analysis engine 440, and a feedback engine 450 that may communicate information about one or more transactions facilitated by the voice based affirmation generator 320 and the voice triggered smart contract hub 420. The computing system 400 may also include, or may be communicatively coupled to, a distributed ledger computing system 410, which may be a blockchain computing system, a Holochain computing system, and/or the like. One or more components of the computer systems 300 and 400 may include the computing devices, and programmed functionality, as discussed above with respect to FIGS. 1A, 1B, and 2.

As discussed above, trades may be booked during a vocal conversation between individual traders, where an electronic recording may be captured from each party (e.g., a trade party and a counter party, such as by the audio capture devices 305*a* and 305*b*. The audio recording may be stored in memory for processing, such as by the audio signal processing devices 310*a* and 310*b*. In some cases, the audio signal processing devices 310*a* and 310*b* may be incorporated in a computing device at a geographic location of the associated trading party or counter party. In some cases, the audio capture device 305*a* and the audio signal processing device 310*a* may be incorporated into a same computing device. In some cases, one or both of the audio signal processing devices 310*a* and 310*b* may be incorporated in a same computing device as the intelligent voice based affirmation generator 320.

The electronically stored audio recordings may include information corresponding to one or more trades between the trading party and the counter party. An audio recording may exist for each party associated with the recorded conversation. For example, a first audio recording may be stored and associated with a computing device of a first enterprise organization (e.g., a financial institution as the trading party) and a second audio recording may be stored and associated with a computing device of a second enterprise organization (e.g., a financial institution as the counter party). To identify a trade, the intelligent voice based affirmation generator 320 may process the first audio recording and the second audio recording to identify and initiate a desired trade, as discussed by the individuals recorded in the audio recording.

An audio recording may be processed by a preprocessing unit (e.g., the signal preprocessor 312*a*, the signal preprocessor 312*b*) of the audio signal processing device 310*a*. The signal preprocessor may perform one or more filtering or signal enhancement techniques to condition at least a portion of the audio recording for further processing. For example, the signal preprocessor 312*a* may filter background or other extraneous audio features not associated with characteristics of a user's voice. The audio signal processing device 310*a* may reassemble the processed audio signal by a signal reconstruction module 316*a* for additional vocal analysis, such as natural language processing (NLP), to identify and extract details of a discussed trade.

In some cases, the signal preprocessor 312*a* may define aspects of a signal envelope, such as a highest and/or lowest point (e.g. a decibel (dB) range) of the audio signal. For example, the audio envelope characteristics may be used when cleaning audio data, such as to reduce extraneous, environmental, or background noise from the audio recording. Additionally, the signal preprocessor 312*a* may analyze the audio signal to define a sample rate (data points per second), an amplitude (dB), and frequency of portions of the audio signal. After pre-processing, the audio signal may be processed by the signal processor 314*a* to extract features of interest in the audio signal, such as by performing a breakdown of the signal and/or classification. For example, the audio signal may be processed by the signal processor 314*a* to breakdown the signal and/or classify aspects of the signal to facilitate user identification based on one or more features of the audio recording. For example, Mel frequency cepstral coefficient (MFCC) and/or is linear prediction cepstral coefficients (LPCC) may be used for vocal identification of a user. For example, the intelligent voice based affirmation generator may identify a speaker in an audio recording using MFCC and LPCC features such as by using a neural network with deep learning or other signal processing models or methods.

MFCC are Cepstral coefficients computed on an adapted frequency scale based on human auditory perception, while LPCC are Cepstral coefficients representative of a human articulatory system and may be based on linear prediction. In some cases, one of the LPCC and MFCC may be used to identify the user, such as to increase accuracy (e.g., LPCC) and/or to increase the speed (e.g., MFCC) of analysis. To increase accuracy of user identification of individuals associated with the audio recording, both LPCC and MFCC may be used for authenticating a speaker.

By authenticating the individuals involved in the recording, corresponding enterprise organizations may be identified to assist in authenticating and securing a trade, and automatically affirming the trade with computing systems of both enterprise organizations. The intelligent voice based affirmation generator 320 may analyze voice signal characteristics and dialect characteristics extracted from paired and processed audio recordings, such as by comparing historical audio signal information and supporting information stored in a central dynamic voice database (e.g., the vocal information data repository 370). In some cases, audio recordings may be paired through metadata associated with the audio signal, such as source device information, time of capture information, geolocation information, and the like). In some cases, such metadata may be used to facilitate identification and authenticate the identity of the individuals recorded in the audio recording. For example, the audio characteristics of the audio signal (e.g., MFCC, LPCC, and the like) may be compared to samples stored in the vocal information data repository to identify a particular user. User identity may be further confirmed such as by comparing metadata of the captured signal with metadata associated with the user associated with authenticated vocal recordings of the individual and other verified information. The other verified information may include identifying characteristics of computing devices associated with the user (e.g., a media access control (MAC) address, an internet protocol (IP) address, and the like), dates of employment, normal working hours, geographic locations associated with particular individuals, and the like.

The intelligent voice based affirmation generator 320 may receive processed signals from the signal processor, such as from the signal processor 314a and the signal processor 314b. A cepstrum processor 330 may be used to further process the signals to extract additional features used by an intelligent voice and dialect processor 360 to identify and authenticate a user speaking in one or both of the captured audio signals. The cepstrum processor 330 may include an MFCC/LPCC vector extraction module 332 and an MFCC/LPCC conversion module 334. The MCFF/LPCC vector extraction module 332 may process one or both signals to extract vectors from the audio signal that provide information about the rate changes in the different spectrum bands of the captured audio signal, or a portion of the audio signal (e.g., an audio clip associated with a time range corresponding to a recorded discussion to initiate a transaction). The MFCC/LPCC conversion module 334 may be programmed to convert a time-domain audio signal into a frequency domain signal for additional processing, such as by applying filters and/or fast Fourier transform (FFT) processes. Converted signal output by the MFCC/LPCC vector extraction module 332 and the MCFF/LPCC vector extraction module 332 may be processed by a neural network engine, an artificial intelligence (AI) model, a machine learning model, based on information retrieved from the vocal information data repository 370 to identify and/or authenticate individual enterprise organization representatives whose speech was captured in the audio signal. Based on an authentication of both individuals associated with each organization that are parties to the proposed transaction, an output converter and signal generation module 380 may generate a trigger signal 392 to automatically trigger execution of an authenticated and secure transaction.

Additionally, a natural language processing (NLP)-based signal decoding module 340 of the intelligent voice based affirmation generator 320 may receive reconstructed audio signals corresponding to the audio signals captured by the audio capture devices 405a and 405b. The NLP-based signal decoding module 340 may process the audio signals to identify attributes of the proposed trade as discussed in the captured audio signals. In some cases, the reconstructed audio signals captured by different audio capture devices may be time-matched such that common trade attributes may be matched and/or verified. A core message signal may be output by the NLP-based signal decoding module 340 and encrypted by the signal encryption module based on an encryption standard. The code generator module 350 may include a long short-term memory (LSTM) engine. The LSTM engine may comprise an artificial recurrent neural network (RNN) architecture to generate a core message signal 394 that comprises information used to automatically generate the desired transaction between the two authenticated and verified organizations that are to be parties to the transaction. Both the trigger signal 392 and the core message signal 394 may be encoded with a unique code for maintaining data security. In some cases, the unique code may include an audio watermark applied to each signal.

The trigger signal 392 may be received by a voice triggered smart contract hub 420 and an LSTM decoder module 422. The voice triggered smart contract hub may be an intelligent computation unit that emulates voice signal information to trigger execution of an appropriate smart contract from a dynamic agreement data repository 425 that may be updated in real time. The LSTM decoder module 422 may receive the trigger signal 392 form the intelligent voice based affirmation generator 320. The LSTM decoder module 422 may decode information in the trigger signal 392 and may perform a data quality check of the decoded information. The decoded information then may be processed by the analysis engine 424, based on information stored in the dynamic agreement data repository, to identify a smart contract to connect the computing networks of the two trading parties. In some cases, one or more smart contracts may be identified based on the verified parties, where an evaluation engine 426 may identify which smart contract (e.g., sc1, sc2, sc3, scn, and the like) to be activated and processed to facilitate the desired transaction. The smart contracts may be stored in a smart contract repository 430. In some cases, smart contract information, trading party information, trade information may be presented to a user via a user interface generated by a user interface visualization engine 428. The user interface may include one or more user input prompts to facilitate entry of a user acceptance input and/or to facilitate user edits or customization of a particular smart contract. Any inputs may be used to update the dynamic smart contract data repository 425 in real time.

The core message signal 394 and the selected smart contract (e.g., sc1) may be communicated to a distributed ledger computing system 410, along with a unique identification and verification code, to activate entry of the smart contract in a secure ledger associated with each financial organization associated with the transaction and smart contract sc1. The distributed ledger computing system 410 may include one or more distributed ledgers associated with individual organizations. In an illustrative example, each distributed ledger 414a-n may be an individual blockchain, where each blockchain corresponds to transactions entered into by individual organizations. As such, each parties blockchain may store a block corresponding to a same smart contract representative of a particular transaction between the two parties. In some cases, each distributed ledger 414a-n may be associated with transaction between counterparties, where each counterparty combination may correspond to a particular blockchain, such that a transaction between those two parties is associated with a single block in that particular blockchain. Each distributed ledger 414a-n may include blocks to perform common functionality, such as a message decoding block 416 and a trade economics segregation block 418. In some cases the message decoding block 416 or blocks may facilitate decryption of the trade information and the trade economics segregation block 418 may isolate the trade economic information. An analysis engine 440 may analyze each new block as it is created for accuracy and/or veracity, where a field-wise comparison may be done to verify correct implementation and creation of the transaction via the smart contract. A feedback engine 450 may generate an output message (e.g., an email, a text message, an alert window, and the like) providing visual and/or audio confirmation and verification that the executed trade has occurred. The feedback may be communicated to the associated enterprise organization networks via one or more user devices 460. If an error occurred, notification is given and feedback may automatically update one or more databases in real time, such as by updating the smart contract data repository 425 and/or the vocal information data repository 370. Additionally or alternatively, a report may be generated and communicated to the enterprise network and including information for one or more trades that had been executed during a particular time period (e.g., minute, hour, day, week, month, and the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
one or more processors; and
non-transitory memory storing instructions that, when executed by a processor, cause the computing platform to:
receive, via a network, a first audio signal from a first source device and a second audio signal from a second source device;
filter, by a first signal processor, the first audio signal to remove extraneous audio features not associated with characteristics of a first voice of a first user;
filter, by a second signal processor, the second audio signal to remove extraneous audio features not associated with characteristics of a second user's voice;
authenticate, via Mel frequency cepstral coefficient (MFCC)-based processing of the first audio signal and dialect characteristics extracted from first processed audio recording associated with the first user, the first user;
authenticate, via MFCC-based processing of the second audio signal and dialect characteristics extracted from second processed audio recordings associated with the second user, the second user;
generate, based on the first audio signal and the second audio signal and valid authentication of the first user and the second user, a trigger signal and a core message signal, wherein the trigger signal corresponds to a request to initiate a smart contract and wherein the core message signal comprises smart contract execution information, wherein each of the trigger signal and the core message signal comprise an audio watermark individually applied to each signal;
identify, based on the trigger signal and decoded information from the core message signal, a smart contract type of a plurality of smart contract types stored in a smart contract repository; and
trigger, via a distributed ledger computing system, based on the trigger signal and the core message signal, execution of a smart contract of the identified smart contract type to execute an electronic transaction communicated in both the first audio signal and the second audio signal, wherein the core message signal and a selected smart contract are entered in a blockchain entry of the distributed ledger computing system.

2. The computing platform of claim 1, wherein the first audio signal is received from a first computing device of a first enterprise computing system and the second audio signal is received from a second computing device of a second enterprise computing system.

3. The computing platform of claim 1, comprising:
authenticating, based on processing of the first audio signal a first individual speaking in the first audio signal; and
authenticating, based on processing of the second audio signal a second individual speaking in the second audio signal.

4. The computing platform of claim 1, wherein the first audio signal and the second audio signal correspond to an audio recording between individual representatives of a first enterprise organization and a second enterprise organization.

5. The computing platform of claim 1, wherein the first audio signal and the second audio signal correspond to an audio recording initiating an electronic transaction between a first enterprise organization and a second enterprise organization.

6. The computing platform of claim 5, wherein the distributed ledger computing system comprises a blockchain computing system.

7. The computing platform of claim 1, wherein the instructions further cause the computing platform to:
decode the trigger signal; and
select, based on a decoded trigger signal, the smart contract from a plurality of stored smart contracts.

8. The computing platform of claim 1, wherein the instructions further cause the computing platform to authenticate the first individual and the second individual based on an analysis of the first audio signal and the second audio signal.

9. The computing platform of claim 8, wherein authenticating the first individual comprises performing a vector analysis of the first audio signal and the second audio signal.

10. The computing platform of claim 8, herein the instructions further cause the computing platform to generate the core message based on natural language processing of the first audio signal and the second audio signal.

11. A system comprising:
a first computing device comprising a first processor and first memory storing first instructions that, when executed by the first processor, cause the first computing device to recording a first audio signal;
a second computing device comprising a second processor and second memory storing second instructions that, when executed by the second processor, cause the second computing device to recording a second audio signal, wherein the first audio signal and the second audio signal correspond to an audio recording of a conversation to initiate an electronic transaction;
a computing platform comprising:
one or more processors; and
non-transitory memory storing instructions that, when executed by a processor, cause the computing platform to:
receive, via a network, the first audio signal from the first computing device and the second audio signal from the second computing device;
filter, by a first signal processor, the first audio signal to remove extraneous audio features not associated with characteristics of a first voice of a first user;
filter, by a second signal processor, the second audio signal to remove extraneous audio features not associated with characteristics of a second user's voice;
authenticate, via Mel frequency cepstral coefficient (MFCC)-based processing of the first audio signal and dialect characteristics extracted from first processed audio recording associated with the first user, the first user;
authenticate, via MFCC-based processing of the second audio signal and dialect characteristics extracted from second processed audio recordings associated with the second user, the second user;
generate, based on the first audio signal and the second audio signal and valid authentication of the first user and the second user, a trigger signal and a core message signal, wherein the trigger signal corresponds to a request to initiate a smart contract and wherein the core message signal comprises smart contract execution information, wherein each of the trigger signal and the core message signal comprise an audio watermark individually applied to each signal;
identify, based on the trigger signal and decoded information from the core message signal, a smart contract type of a plurality of smart contract types stored in a smart contract repository; and
trigger, via a distributed ledger computing system, based on the trigger signal and the core message signal, execution of a smart contract of the identified smart contract type to execute the electronic transaction communicated in both the first audio signal and the second audio signal, wherein the core message signal and a selected smart contract are entered in a blockchain entry of the distributed ledger computing system.

12. The system of claim 11, wherein a first enterprise computing system comprises the first computing device and a second enterprise computing system comprises the second computing device.

13. The system of claim 11, comprising:
authenticating, based on processing of the first audio signal a first individual speaking in the first audio signal; and
authenticating, based on processing of the second audio signal a second individual speaking in the second audio signal.

14. The system of claim 11, wherein the first audio signal and the second audio signal correspond to an audio recording between individual representatives of a first enterprise organization and a second enterprise organization.

15. The system of claim 11, wherein the first audio signal and the second audio signal correspond to an audio recording initiating an electronic transaction between a first enterprise organization and a second enterprise organization.

16. The system of claim 15, wherein the distributed ledger computing system comprises a blockchain computing system.

17. The system of claim 11, wherein the instructions further cause the computing platform to:
decode the trigger signal; and
select, based on a decoded trigger signal, the smart contract from a plurality of stored smart contracts.

18. The system of claim 11, wherein the instructions further cause the computing platform to authenticate the first individual and the second individual based on an analysis of the first audio signal and the second audio signal.

19. The system of claim 18, wherein authenticating the first individual comprises performing, based on voice and dialect matching, a vector analysis of the first audio signal and the second audio signal.

20. The system of claim 11, wherein the instructions further cause the computing platform to generate the core message based on natural language processing of the first audio signal and the second audio signal.

* * * * *